United States Patent Office 2,888,341
Patented May 26, 1959

2,888,341

METHOD OF TREATING PARTICULATE IRON ORE

Robert M. Lawless, Midland, and Adam F. Klopf, Bay City, Mich., assignors to The Dow Chemical Company, Midland, Mich., a corporation of Delaware No Drawing. Application October 12, 1956
Serial No. 615,484

5 Claims. (Cl. 75—3)

This invention relates to the treatment of particulate iron ore, and more especially relates to the conglobation into pellets or to pressure-molding into briquets of concentrates of such particulate ore derived from lower grade iron ores.

By lower grade iron ores is meant those ores containing a lesser percent of iron than is found in hematite shipping ores, the latter being ores which are sufficiently rich in iron content to be acceptable for shipment. The more desirable hematite shipping ores, such as the Marquette ores of Michigan and the Mesabi ores of Minnesota, contain 52 to 55 percent iron. However, certain less desirable ores having as low a percentage of iron as 35 percent are sometimes designated shipping ores with a penalty attached, the penalty being due to the increased transportation costs per ton of available iron. The lower grade iron ores are sometimes referred to as ferruginous chert because they are not sufficiently rich in iron before concentration to be designated ores. They contain less than 35 percent iron as mined. An example of such low grade ore is the taconites of Minnesota which contain about 27 percent iron. The iron in taconites is usually present as magnetite, the magnetic oxide of iron, $Fe_3O_4$, but may be present as mixtures of the common oxides, such as hematite, magnetite, limonite and martite. Magnetic taconite is considered to be the largest future source of iron ore in the United States.

To obtain iron from taconite ores, the oxidized iron must be reduced as by smelting in a blast furnace. Before being fed into a blast furnace, ferruginous chert such as taconite must undergo certain requisite preparatory treatment known as beneficiation. It is usually done near the mine to reduce shipping charges. Beneficiation consists largely of separating the valuable iron oxide from the gangue, i.e., the relatively worthless rock vein material or matrix, largely siliceous, which occurs naturally with the iron oxides. The chert is usually pulverized, wet-ground, and separated into concentrate and gangue by flotation or magnetic means. Separation of ore containing magnetite is greatly aided by the magnetic character of the magnetite. The resulting concentrate is in a particulate or even pulverulent state and cannot be fed directly to a blast furnace because, when such an attempt is made, a large portion of such material is blown back out of the furnace. It is therefore necessary that the particulate concentrate be agglomerated as by conglobating into pellets or molding into briquets.

Conglobating into pellets, sometimes referred to as pelletizing or pelleting, herein means subjecting a tacky or moderately cohesive material to a rolling motion as in a rotating open-end drum or cylinder whereby the material rolls upon itself and thereby gradually agglomerates into small generally spheroidal bodies or agglomerates and thereafter indurating the bodies or agglomerates by heat. Molding into briquets or briquetting refers to forcing under pressure a moldable predetermined volume of a moderately cohesive particulate material into small cavities or pockets and thereafter indurating the molded material by heat.

The formation of pellets or briquets which satisfactorily withstand shipping and handling, the impact of being dropped into a blast furnace, and the weight of additional pellets or briquets being superimposed on them in the furnace, has been accompanied by numerous problems which heretofore have not been satisfactorily solved. Failure to solve these problems has been a serious deterrent to the economical use of the large resources of low grade iron ores such as taconite.

Although certain clays and inorganic cements have been employed as binding agents for particulate iron ore with some degree of success, they have been by no means wholly successful for a number of reasons. One reason is that such clays and cements have not imparted sufficient binding properties to the pellets or briquets to withstand the handling and impact referred to above unless subjected to sintering at a temperature of 1200° to 1300° C. Such a high temperature is not only time-consuming and requires large initial investments and extensive operating and maintenance costs, but entails a difficult control problem. If the temperature stated above rises to the fusion temperature of the oxides of iron present, which is about 1400° C., the ore fuses into a mass. Such a fusion is highly undesirable not only because the fused pellets must somehow be again separated, but because it may result in a complete shutdown as where shaft furnaces are used, or in burned-out grates where a traveling grate type of furnace is used. A further reason is that such pellets or briquets when first formed are lacking in green strength and consequently high breakage results prior to the heating step.

Insofar as is known, there is no economical and fully satisfactory method now available of preparing low grade iron ore for smelting in a blast furnace. Accordingly, it is the principal object of the invention to provide a method of fulfilling this need. The invention consists essentially of incorporating from 0.2 to 5.0 percent by weight, and preferably about 2.0 percent, of calcium chloride into particulate or pulverulent iron ore in the presence of moisture, conglobating or molding the so-treated particulate ore into small agglomerates, and thereafter indurating the small agglomerates by the application of moderate heat, e.g., 250° to 1250° C.

If the small agglomerates are made by conglobating into pellets, water must be present in an amount between 7 and 12 percent by weight of the ore and preferably between 9 and 11 percent. For molding into briquets, a lesser amount of water is used, generally an amount between 3 and 6 percent. The pellets are generally spheroidal having a minimum dimension of over 2 millimeters and preferably a maximum dimension of not over 50 millimeters. The briquets are customarily pillow-shaped, cylindrical, or spheroidal although other shapes may be used.

The mechanical and chemical intricacies of the action of calcium chloride on the iron ore according to the invention are not known for certain, but the calcium chloride appears to aid in a very effective manner the induration at moderate heat by both a cementing action and a catalytic action effecting oxidation of the magnetite, $Fe_3O_4$, to hematite, $Fe_2O_3$. The cohesive property of the latter when formed in situ is considerably greater than that of magnetite.

In practicing the invention, the calcium chloride may be incorporated dry, as by introducing it together with the moist particulate ore into a mixer equipped with a beater or paddle, or by feeding the calcium chloride and the particulate ore simultaneously or alternatively at short intermittent periods directly, or by means of a hopper or conveyor, into a rotating hollow preferably inclined cylinder, for conglobating into pellets or into cavities associated with a pressure means for molding the resulting compacted mixture into briquets.

As an alternative mode of practicing the invention, the calcium chloride may conveniently be fed as a natural or artificial brine. The natural brine may be used in its natural state as the sole source of $CaCl_2$ or it advantageously may be fortified by additional calcium chloride before being employed according to the invention or by mixing some dry $CaCl_2$ into the ore before treating it with the brine. The brines may also be desalted, i.e., have some of or all of the sodium chloride removed, prior to their employment according to the invention.

Although calcium chloride is the effective binding agent of a natural brine suitable for the invention, the presence of limited amounts of other dissolved inorganic compounds, e.g., hydroxides and other chlorides, may be tolerated.

Although brines containing sufficient amounts of calcium chloride, despite the presence of other inorganic compounds, were found to be suitable for the practice of the invention, it was discovered that the presence of magnesium chloride was somewhat deleterious to the induration of the pellets or briquets formed, as shown by friability tests explained hereinafter. It is desirable that no magnesium chloride be present in the treated ore. Although $MgCl_2$ up to 0.5 percent of the treated ore may be tolerated, it is a preferred embodiment of the invention to cause the $MgCl_2$ to undergo a chemical change as by the addition of CaO or $Ca(OH)_2$. The effectiveness of the calcium chloride brine containing magnesium chloride is enhanced therefore by liming, as by the addition of between 0.3 and 1.5 stoichiometrically equivalent weights of calcium oxide or calcium hydroxide per weight of the $MgCl_2$ present in the brine.

When iron ore is fed to a blast furnace, it is dropped a number of feet. For pellets or briquets to be satisfactory, breakage resulting from such dropping must be relatively small. It is preferred by blast furnace operators that pellets and briquets produce less than 10 percent fines, as determined by passage through a United States Standard No. 10 mesh screen which does not permit passage therethrough of particles having a greater dimension than 2 millimeters after three successive drops of 33 feet onto a 0.5 inch thick steel or iron plate. The percent of bits of ore resulting from broken pellets or briquets passing through the screen is taken as the measure of friability. As a satisfactory alternative means for determining friability and the one used in the examples hereinafter set out, the pellets or briquets are placed in an apparatus which consists of a three-foot long cylindrical steel tube, 3 inches in diameter, and capped at both ends with cast iron end plates. It is rotatably mounted midway between its ends on a horizontal axle perpendicular to the longitudinal axis of the tube and powered so as to rotate slowly end over end. Pellets or briquets to be tested are placed inside the tube which is then rotated end over end 29 times at 19 r.p.m. The so-treated product is removed from the tube and screened on a No. 10 mesh screen. The percent by weight of the product passing through the screen in the test is determined and is herein used as the measure of friability.

Although the practice of our invention is not to be limited to the conditions which yield pellets and briquets meeting the desired 10 percent friability test, it will be shown by the examples below that this test is very easily met by the preferred conditions of the invention.

The principle of the invention will be made manifest by the examples set out hereinafter.

Magnetic taconite concentrate, prepared by a beneficiation process broadly described hereinabove from ore of the Minnesota Mesabi range, was used in the examples. After completely drying the sample of the ore at 95° C., it was analyzed prior to being employed in the examples and found to contain the following weight percent of components, for which an analysis was obtained, based on the dry weight of the sample:

| Component: | Percentage by weight |
|---|---|
| Iron (calculated as $Fe_3O_4$) | 62.6 |
| Silicon dioxide | 8.62 |
| Aluminum oxide | 0.16 |
| Magnesium oxide and calcium oxide (calculated as MgO) | 0.21 |
| Manganese | 0.16 |
| Phosphorus | 0.01 |
| Sulfur | 0.08 |

EXAMPLE 1 TO 4

These are examples of the invention in which dry $CaCl_2$ was incorporated into the ore concentrate, the pertinent data being set forth in Table I. Batches for use in these examples were prepared by placing 100 grams of ore concentrate in a 500-cc. steel mortar, adding the dry $CaCl_2$ in the desired amounts set forth in the table, mixing by the aid of a pestle, and thereafter adding an amount of water sufficient to impart proper conglobating consistency which was usualy between 10 and 11 percent of the weight of the ore.

Because of the small batches used in these examples, pellets were formed by hand. This was done by forming 8-gram portions of the mixture into spheroidal pellets by rolling them between the palms of the hands.

The pellets were indurated by heating in an oven in two stages. The first stage consisted in preheating at about 180° C. for 20 minutes and the second step consisted of raising the temperature to about 450° C. over a period of about 25 minutes and then heating at that temperature for 35 minutes. Drying was effected in a 12 x 12 x 30-inch electric muffle furnace into which air was formed at the rate of 12 liters per minute. The pellets were conveniently placed in a drying oven on racks. The circulating air was employed because it was found that a means of carrying away the moisture which was driven out of the drying pellets was desirable. One reason attributed to this is that the presence of excessive moisture in the oven excluded some of the oxygen which is necessary for the conversion of magnetite to hematite.

The friability of the indurated pellets was ascertained by employing the rotating tube testing apparatus according to the method described hereinbefore. The friability test was run as described after cooling the pellets for 15 minutes. As a blank for comparison, a 100-gram sample of the ore was treated in the same manner as in the examples but without the addition of calcium chloride. Table I shows the results of the friability tests for Examples 1 to 4.

*Table I*

| Example | Grams of $CaCl_2$ | Friability in percent |
|---|---|---|
| Blank | 0 | 100.0 |
| 1 | 0.6 | 19.5 |
| 2 | 1.2 | 1.2 |
| 3 | 1.8 | 0.6 |
| 4 | 2.4 | 0.3 |

Table I shows a marked decrease in friability by the addition of $CaCl_2$ in the amounts shown.

EXAMPLES 5 TO 7

These are examples of the invention in which pellets were prepared and tested as in the above examples except that both $MgCl_2$ and $CaCl_2$ in dry form were added in varying amounts. The amounts of $MgCl_2$ and $CaCl_2$ present per 100 grams of ore and the friability test on the pellets are shown in Table II.

Table II

| Example | Grams of CaCl₂ | Grams of MgCl₂ | Friability in percent |
|---|---|---|---|
| 5 | 0.6 | 0.6 | 31.7 |
| 6 | 1.2 | 0.6 | 12.3 |
| 7 | 1.8 | 0.6 | 3.5 |

For comparison exactly similar tests were made in which magnesium chloride was substituted for calcium chloride with the results as set forth as Tests A, B, and C of Table III.

Table III

| Comparison Test | Grams of MgCl₂ | Friability in Percent |
|---|---|---|
| A | 0.6 | 59.1 |
| B | 1.2 | 59.9 |
| C | 1.8 | 52.5 |

Table III shows that $MgCl_2$ alone does not provide a pellet which is satisfactorily resistant to breakage.

By comparing the friability of Example 1 with that of Example 5, wherein both contained 0.6 percent of $CaCl_2$ but Example 5 also contained 0.6 percent $MgCl_2$, a loss in effectiveness of the $CaCl_2$ is noted when $MgCl_2$ was also present. However, it is noted that by increasing the percent of $CaCl_2$ to 3 times the $MgCl_2$ present, as in Example 7, good results were obtained, although not so good as were obtained in Example 3 when no $MgCl_2$ was present.

EXAMPLES 8 TO 10

These are examples of the invention in which pellets were prepared and tested as in Examples 5, 6, and 7 except that CaO was added to the ore along with the calcium chloride. The amounts of $MgCl_2$, $CaCl_2$ and CaO present per 100 grams of ore and the resulting friability tests are shown in Table IV.

Table IV

| Example | Grams of CaCl₂ | Grams of MgCl₂ | Grams of CaO | Friability in Percent |
|---|---|---|---|---|
| 8 | 0.6 | 0.6 | 0.4 | 1.3 |
| 9 | 1.2 | 0.6 | 0.4 | 0.2 |
| 10 | 1.8 | 0.6 | 0.4 | 0.15 |

The low friability of the pellets made when CaO was added to react with the $MgCl_2$ present are readily apparent from the results shown in Table IV.

EXAMPLES 11 TO 15

These are examples of the invention in which 100-gram portions of the iron ore concentrate, described above, had admixed therewith a natural brine, having a specific gravity of 1.27, the analysis of which may be expressed in terms of the salts present, as in the table below:

Salts: Percentage by weight
  $CaCl_2$ _____ 16.7
  $MgCl_2$ _____ 9.4
  KCl _____ 0.96
  NaCl _____ 2.70
  $SrCl_2$ _____ 0.28

Brine, concentrated, partially desalted, and diluted as explained below, may be employed in the practice of the invention instead of substantially dry $CaCl_2$ as in the previous examples. The total water content of the mixture of ore and brine was adjusted to about 10 to 11 percent. The procedure followed was similar to that employed in the previous examples. Prior to incorporating the brine into the ore concentrate, partial concentrating and desalting were accomplished by evaporation of some of the water to a specific gravity of 1.440 at 63° C. As a result, some of the sodium chloride crystallized and settled out of the brine. The so-crystallized sodium chloride was largely removed. The clear concentrated brine remaining was diluted with water to a specific gravity of 1.342 at 20° C. to give a total salt content of about 36 percent. The brine so prepared then contained the following percentages of dissolved salts:

Salts: Percentage by weight
  $CaCl_2$ _____ 22.0
  $MgCl_2$ _____ 12.3
  NaCl _____ 0.65
  KCl _____ 1.13
  $SrCl_2$ _____ 0.32

Since the brine contains among other salts, $MgCl_2$ as well as $CaCl_2$, CaO was added as pointed out hereinabove, in accordance with one embodiment of the invention, except in Example 11 which served as a comparison. The CaO was added in dry form to the ore concentrates before the brine was added. The pertinent data of Examples 11 to 15 are set forth in Table V, showing the amounts of brine and CaO added as well as the friability of the pellets made from the resulting ore mixtures.

Table V

| Examples | Grams of Desalted Natural Brine | Grams of CaO | Friability in Percent |
|---|---|---|---|
| 11 | 8.0 | 0 | 14.0 |
| 12 | 2.0 | 0.15 | 13.0 |
| 13 | 4.0 | 0.3 | 0.5 |
| 14 | 6.0 | 0.45 | 0.2 |
| 15 | 8.0 | 0.6 | 0.13 |

EXAMPLE 16

A rotatable drum having a diameter of 36 inches and a length of 12 inches was positioned with its axis horizontal. It was made to rotate at 8 r.p.m. 400 grams per minute of the conglobating mixture of Example 1 were fed into the drum. The pellets formed were spheroidal and had an average maximum dimension of about 0.75 inch. The friability of the pellets as tested by the apparatus used in the previous examples, was 4.6, which is comparable to that obtained with the hand-made pellets.

The example was repeated using an 18-inch diameter drum, rotated at 12 r.p.m. There was no appreciable difference in the quality of the pellets formed.

EXAMPLE 17

The Mesabi taconite concentrate similar to that used in the making of pellets above was placed in a 500-cc. steel container and 8% by weight of the same natural brine as used in Examples 11 to 15 was admixed therewith. The brine used in this example, however, was not concentrated or desalted. An analysis, for the following salts, showed them to be present as follows:

Salt: Weight percentage
  $CaCl_2$ _____ 17.01
  $MgCl_2$ _____ 9.49
  KCl _____ 0.94
  NaCl _____ 2.74
  $SrCl_2$ _____ 0.32

The moisture content of the resulting mixture was adjusted to between 5 and 7 percent by weight of the mixture and suitable size portions thereof forced at 7,000 p.s.i. into one-inch diameter cylindrical molds to make briquets 0.75 inch long. The resulting briquets were indurated at 450° C. for two hours. The friability was tested as in the above examples according to the procedure used on the pellets. The friability was 6.8 percent.

The example was repeated, using another natural brine having the following analysis in terms of the salts for which analysis was made:

| Salt: | Weight percentage |
|---|---|
| $CaCl_2$ | 19.03 |
| $MgCl_2$ | 3.65 |
| KCl | 1.68 |
| NaCl | 5.20 |
| $SrCl_2$ | 0.46 |

The friability of the briquets thus made was determined as in the previous examples and found to be 4.0 percent.

An examination of the examples of the invention set out above illustrates the advantages of treating particulate taconite ore concentrate with calcium chloride. The calcium chloride employed may be dry or in a synthetic or natural brine. Magnesium chloride when present, though deleterious as such, may be rendered non-deleterious or even made to improve the effect of the brine by the addition of more or less molar quantities of lime. The pellets and briquets are best indurated at 450° to 650° C. This temperature represents a considerable saving over heating at 1200° to 1300° C. as is done in current practice. The so-treated taconite may be made into pellets or briquets which have higher green bonding strength as well as higher ultimate bonding strength after induration as shown by the reduction in breakage in the friability test. The strength of the pellets and briquets, when made according to the preferred conditions of the invention, is well within the friability requirement for feed to blast furnaces. Agglomerates of the invention, containing $CaCl_2$, perform satisfactorily in blast furnaces and other smelters.

What is claimed is:

1. A composition of matter consisting essentially of from 0.6 to 2.4 weight percent of calcium chloride, from 3 to 12 weight percent of water, magnesium chloride in amount not over 3.0 weight percent, calcium oxide in a ratio between 0.3 and 1.5 moles of calcium oxide to each mole of magnesium chloride present, and the balance particulate beneficiated iron ore wherein at least a portion of the iron is magnetite.

2. The process of rendering particulate iron ore cohesive which comprises adding thereto in the presence of from 3 to 12 weight percent of water, between 0.6 and 2.4 weight percent of calcium chloride, not over 3.0 weight percent of magnesium chloride, and calcium oxide in a ratio between 0.3 and 1.5 moles of calcium oxide to each mole of magnesium chloride added.

3. The process of claim 2 wherein the calcium chloride and magnesium chloride are added as a brine.

4. The process of claim 3 wherein the brine is a natural brine.

5. Agglomerates possessing high resistance against breakage when dropped having dimensions of not less than 2 millimeters and not more than 50 millimeters consisting of the resulting adhesive product formed by heat-indurating, at above 250° and below the sintering temperature for from 1 to 4 hours, the admixture consisting essentially of between 1 and 3 percent $CaCl_2$, $MgCl_2$ in an amount not exceeding 3 percent, an amount of CaO sufficient to establish a ratio of between 0.3 and 1.5 moles thereof per mole of $MgCl_2$ employed, between 3 and 12 percent water, and the balance pulverulent beneficiated taconite iron ore.

References Cited in the file of this patent

UNITED STATES PATENTS

| 1,308,931 | Catlett | July 8, 1919 |
| 2,532,335 | Royster | Dec. 5, 1950 |
| 2,766,109 | Komarek et al. | Oct. 9, 1956 |
| 2,771,354 | Moklebust | Nov. 20, 1956 |

OTHER REFERENCES

Journal of The Iron and Steel Institute, No. II, 1954, vol. 177, pages 13-24 (pages 16 and 18 relied on).

UNITED STATES PATENT OFFICE

CERTIFICATE OF CORRECTION

Patent No. 2,888,341                                                       May 26, 1959

Robert M. Lawless et al

It is hereby certified that error appears in the printed specification of the above numbered patent requiring correction and that the said Letters Patent should read as corrected below.

Column 4, line 36, for "formed" read -- forced --.

Signed and sealed this 10th day of November 1959.

(SEAL)
Attest:

KARL H. AXLINE                                              ROBERT C. WATSON
Attesting Officer                                         Commissioner of Patents